July 25, 1967

J. B. BATSON 3,332,313

APPARATUS FOR ABSORPTION SPECTRA ANALYSIS

Filed April 2, 1962

JOSEPH BOILLIN BATSON,
INVENTOR.

BY Robert W Black

AGENT

July 25, 1967

J. B. BATSON 3,332,313

APPARATUS FOR ABSORPTION SPECTRA ANALYSIS

Filed April 2, 1962

INVENTOR.
JOSEPH BOILLIN BATSON,
BY Robert W Black
AGENT

July 25, 1967
J. B. BATSON
3,332,313
APPARATUS FOR ABSORPTION SPECTRA ANALYSIS
Filed April 2, 1962
4 Sheets-Sheet 3
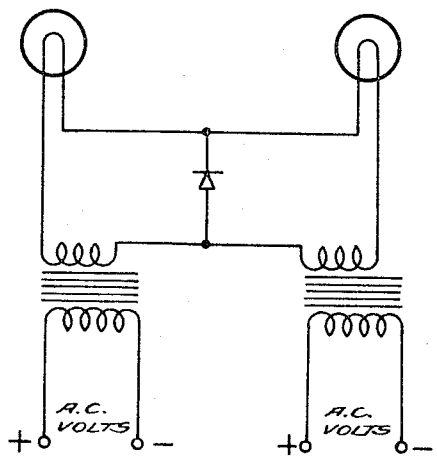
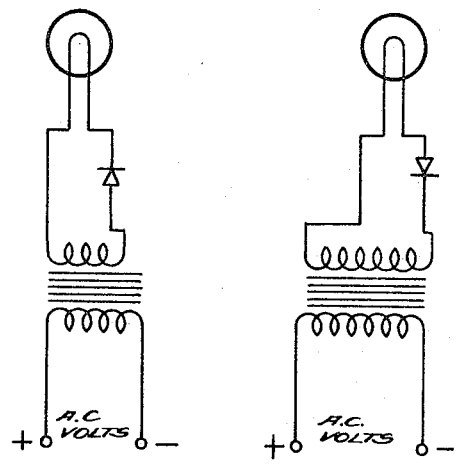
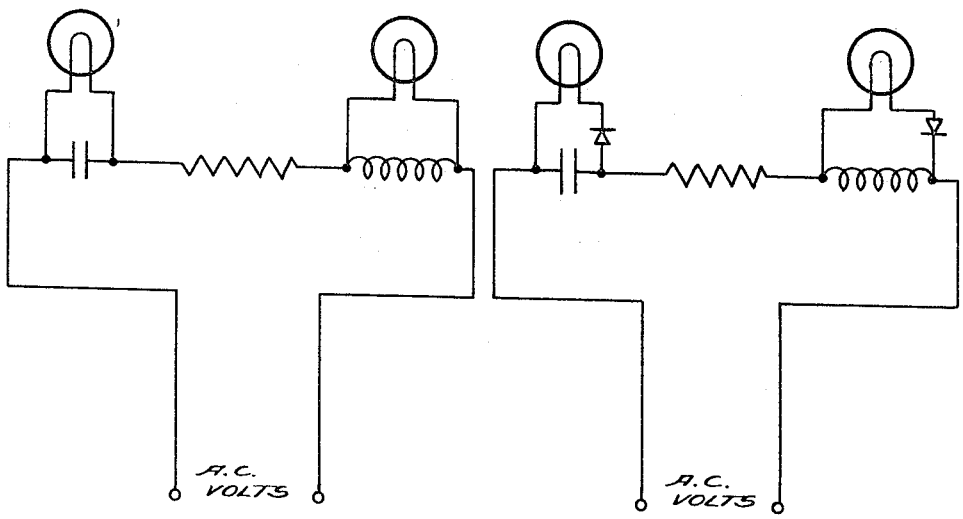
INVENTOR.
JOSEPH BOILLIN BATSON,
BY Robert W Black
AGENT July 25, 1967     J. B. BATSON     3,332,313
APPARATUS FOR ABSORPTION SPECTRA ANALYSIS
Filed April 2, 1962     4 Sheets-Sheet 4
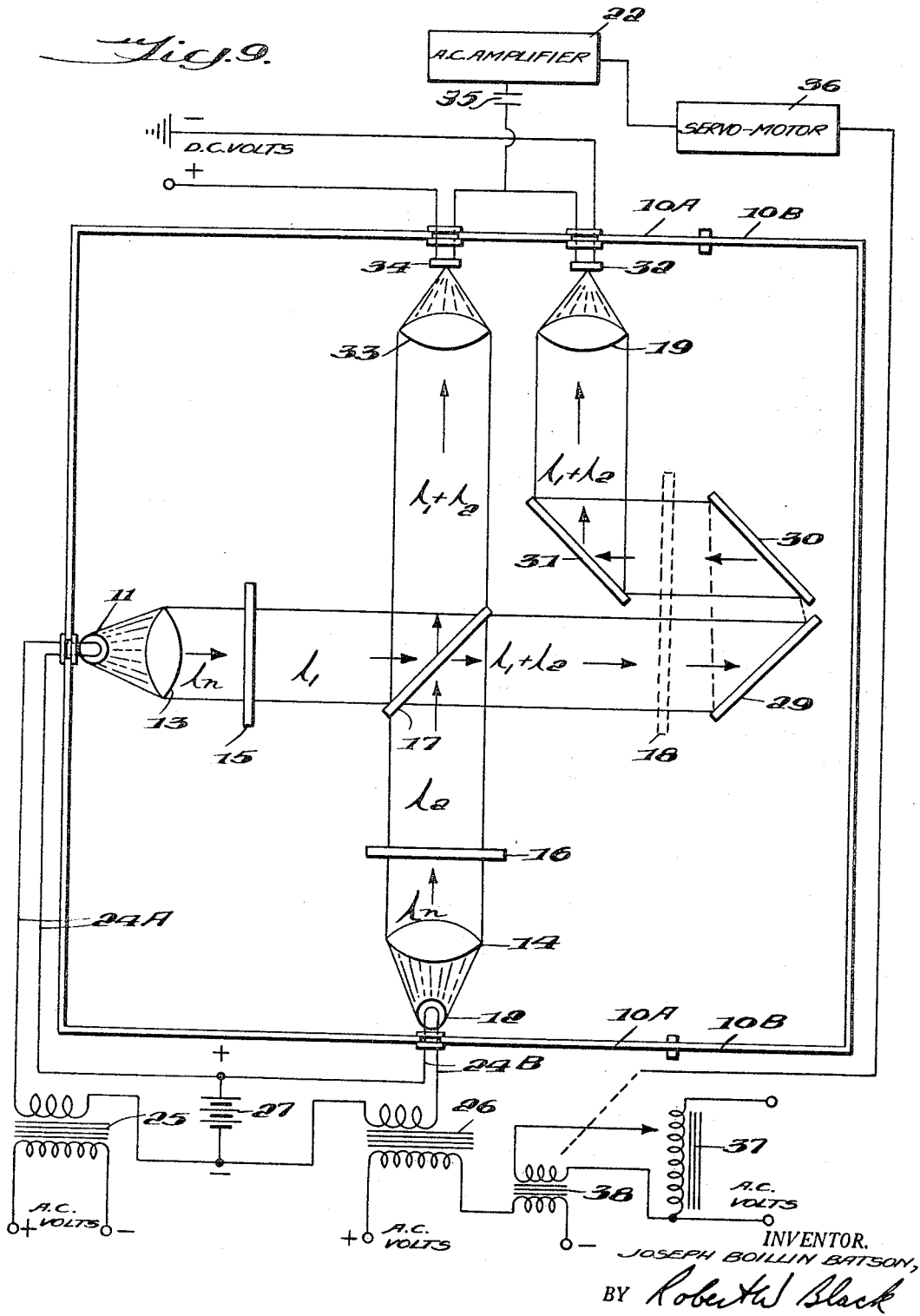

United States Patent Office 3,332,313
Patented July 25, 1967

3,332,313
APPARATUS FOR ABSORPTION SPECTRA ANALYSIS
Joseph Boillin Batson, Nashville, Tenn., assignor to E. I. du Pont de Nemours and Company, Wilmington, Del., a corporation of Delaware
Filed Apr. 2, 1962, Ser. No. 184,349
4 Claims. (Cl. 88—14)

This invention relates to analytical apparatus and more particularly to absorption spectral apparatus for quantitative analysis of materials which strongly absorb radiant energy of particular wave lengths in the ultraviolet, visible or infrared spectral regions.

It is well known that most organic and inorganic substances, which may be in either the solid, liquid or gaseous state, preferentially absorb certain bands of radiant energy. It is also known that the particular wave lengths of radiant energy preferentially absorbed by a particular material are determined by its chemical composition and that the amount of the radiation preferentially absorbed by the material is a function of its concentration. Hence, by taking advantage of these properties, it is possible to analyze most substances both quantitatively and qualitatively by absorption spectral analysis.

In general, radiation within the spectral range of 220 millimicron to 15 microns, which includes the ultraviolet, visible and infrared regions can be used in absorption spectral analysis. However, of these three spectral regions, the most useful for analytical purposes is the infrared region, since most materials, particularly organic materials, selectively absorb several narrow bands of radiation energy within the infrared region as a result of intramolecular vibrations.

The absorption spectral apparatus of this invention is particularly useful for quantitative analysis employing infrared radiation and will be described in detail hereinafter with specific reference to various embodiments designed for use in this spectral region. It should be clearly understood, however, that the apparatus of this invention can be used advantageously in spectral analysis employing ultraviolet and visible radiation.

A wide variety of apparatus for absorption spectral analysis has been described in the literature within the last twenty years; however, all of the known apparatus have many undesirable features which limit their usefulness, particularly in industrial manufacturing plants for continuous, in-process analysis. The known absorption spectral analysis apparatus are, in general, expensive, bulky, contain many fragile and moving parts in the optical system which must be carefully aligned and are very sensitive to mechanical vibrations or shock, and will not function properly if exposed to conditions of abnormal temperatures or humidity or to corrosive fumes, which conditions are often encountered in manufacturing plants. The known apparatus also employ rather complicated and expensive electronic systems to amplify weak electrical signals to activate the indicating or recording read-out device. Because of their sensitivity to mechanical vibration or shock and the critical alignment of the optical system, known absorption spectral apparatus are not suitable for applications which require that the apparatus be in motion during use; for example, to continuously scan and analyze a moving web of film. Furthermore, the known absorption spectral analysis apparatus requires highly skilled technicians for their proper maintenance and satisfactory operation.

It is an object of this invention to provide an analytical apparatus for analyzing materials in accordance with absorption spectral principles.

A further object of this invention is to provide an analytical apparatus for analyzing materials in accordance with absorption spectral principles.

A further object of this invention is to provide an analytical apparatus capable of determining and recording the concentration of materials by the measurement of their light radiation transmission values.

Another object of this invention is to provide an analytical apparatus adapted to measure light radiation transmission values over a wide spectral range including the ultraviolet, visible and infrared regions.

A still further object of this invention is to provide an analytical apparatus of simple construction and operation free from many sensitive, fragile and moving parts in the optical system.

Still another object of this invention is to provide an analytical apparatus for continuously scanning and analyzing a moving web of film. These and other objects will appear heereinafter.

These and other objects of this invention are accomplished by an apparatus for absorption spectral analysis comprising, in combination, two radiation sources which continuously radiate over a common spectral range; circuity means connected to said radiation sources for continuously fluctuating the intensity of radiation from each of said radiation sources between two intensity levels at a definite frequency; circuity means integral with said intensity fluctuating means for fixing the frequency phase relationship between the two said radiation sources such that one source is radiating at its peak operating intensity at the time the other source is radiating at its minimum operating intensity; means positioned in optical alignment with one of said radiation sources for selecting from said radiation source a band of radiation which is adsorbable by a constituent of the material being analyzed; means positioned in optical alignment with the other said radiation source for selecting from the other said radiation source a band of radiation not appreciably adsorbable by said constituent of the material being analyzed; and a detector positioned to receive the radiation passing from the two said radiation sources through the material being analyzed and to generate from this radiation a fluctuating electrical signal when there exists an unbalance between the intensities of the radiation received from the two said radiation sources, said signal being of an amplitude that is a function of the concentration of light adsorbable constituent in the material being analyzed and of a frequency equal to the frequency of fluctuation of intensity of the two said radiation sources.

A preferred embodiment of this invention is an apparatus for absorption spectral analysis comprising two light sources each of which has a tungsten filament that is heated to incandescence by a direct electrical current upon which is superimposed 60-cycle, alternating electrical current producing a 60-cycle, modulated, direct current, circuity means for passing this modulated direct current through the filaments of the two light sources 180° out of phase with one another, means for collimating radiation emitted from each of said light sources, each of said means positioned in optical alignment with each of said two light sources, means in optical alignment with said first collimating means for selecting from the collimated radiation from one of said light sources a band of radiation of wave lengths which are absorbable by a constituent of the material being analyzed, means in optical alignment with said second collimating means for selecting from the collimated radiation from the other light source a band of radiation not appreciably absorbed by said constituent of the material being analyzed, stationary means disposed at the intersection of said radiation bands for continuously combining a portion of each of said selected bands of collimated radiation and to cause the combined portions of radiation to follow a common optical path through the material being analyzed, a detector positioned to receive the collimated, selected bands of radiation passing from the two said light sources through the material being analyzed and capable of generating a fluctuating electrical signal as a result of any unbalance in the amount of radiant-energy received from the two said light sources, means responsive to the fluctuating signal generated by the detector to adjust the intensity of the radiation from one of said light sources to equalize the amount of radiation received from both light sources by the detector, wherein the magnitude of said adjustment is a measure of the concentration of light absorbing constituent of the material being analyzed.

The invention will be described in greater detail hereinafter in conjunction with the drawings, in which:

FIGURES 5, 6, 7 and 8 are illustrative diagrams of alternative electrical supply systems, and;

FIGURE 9 illustrates diagrammatically the particularly preferred embodiment of the present invention.

The improved absorption spectral apparatus of this invention is made possible by the novel use of two light sources which constantly vary in intensity out of phase. Therefore, it seems appropriate to describe in some detail the physical principles involved in the operation of the two light sources before proceeding with complete descriptions of various embodiments of the invention.

Figure 1:
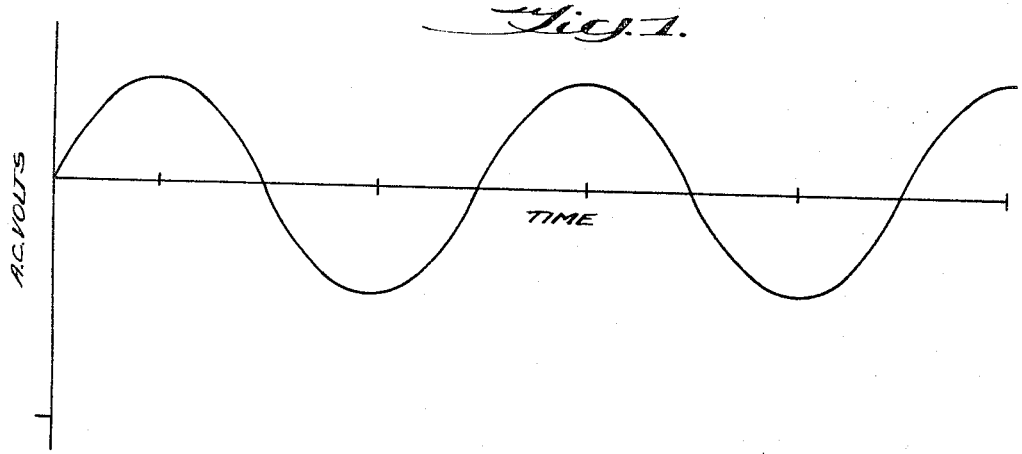
FIGURE 1 is an illustrative diagram of the voltage-time relationship for alternating electrical current.
Figure 2:
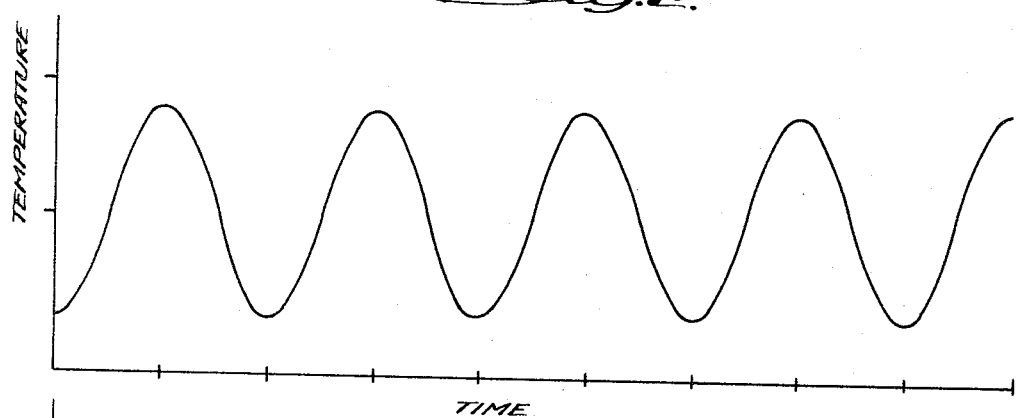
FIGURE 2 is an illustrative diagram of the temperature-time relationship for a light filament heated with the A.C. current illustrated in FIGURE 1.

It is well known that when a material such as the filament of an ordinary electric light bulb is heated to an elevated temperature, it will emit radiation over a range of wave lengths. The particular range of wave lengths of the radiation emitted by the filament is a function of the temperature. Radiation emitted at low temperatures is predominantly of long wave lengths, while at higher temperatures radiation of shorter wave lengths will be present in the emitted spectrum in proportions depending upon the composition of the filament and the temperature. The total amount of radiant energy emitted by the filament and the energy or intensity of any particular wave length are also functions of the temperature of the filament and, in general, will increase as the temperature of the filament increases. Thus, if the temperature of the filament is caused to fluctuate between two temperature levels, the intensity of any particular wave length of radiation will fluctuate accordingly. For example, if a full-wave, alternating electrical current, such as that illustrated graphically in FIGURE 1, is passed through the filament of an electric light bulb, the alternating current will cause the temperature of the light bulb filament to fluctuate between two temperature levels as illustrated in FIGURE 2. It should be noted that the temperature of the filament is dependent only upon the magnitude of the current flowing through it regardless of the direction of current flow; therefore, the temperature of the filament will fluctuate at a frequency twice the frequency of the alternating electrical current passing through the filament. Because of the relationship already described, the total amount of radiation and the intensity of radiation of any particular wave length will fluctuate at twice the frequency of the alternating current. The amplitude range over which the light intensity fluctuates will be determined by the magnitude of the peak of the alternating current, the size of the filament, the external temperature, and the frequency of the alternating current. The amplitude of light intensity fluctuation is greater when low frequency alternating electrical current is used, since the light filament has more time to cool to a lower temperature between current surges.

Figure 3:
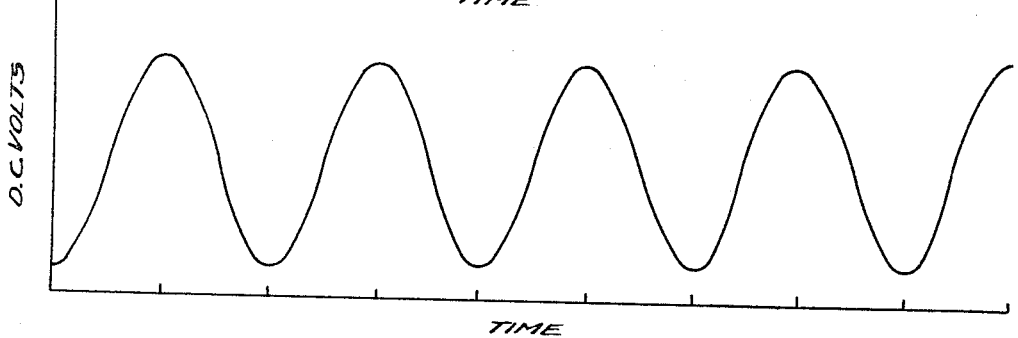
FIGURE 3 is an illustrative diagram of the voltage-time relationship of the modulated D.C. current produced by the detector receiving radiation from a light filament heated with the A.C. current illustrated in FIGURE 1.

As a result of the factors just considered, radiation emitted from a filament heated by full-wave alternating current and allowed to impinge upon a light detector, such as a photoelectric cell, will generate a fluctuating electric signal having a frequency twice the frequency of the full-wave alternating current passing through the filament. It should be mentioned, however, that the fluctuating signal produced by the detector is modulated D.C. electric current, the minimum value of which depends upon the amount of radiation received from the filament at the low temperature of the fluctuating temperature cycle. The magnitude of the modulated D.C. current produced by the detector will vary with time in a sinuous manner as illustrated in FIGURE 3.

If the electric light bulb filament under consideration is heated by half-wave, rectified alternating current, the frequency of the cycles of temperature variations and, consequently, the frequency of emitted radiation intensity fluctuations, will be equal to the frequency of the alternating current from which the rectified current was obtained. Radiation emitted from a filament heated in this manner and allowed to strike a detector, such as a photoelectric cell, would produce a modulated D.C. electric current having the same frequency as the frequency of the alternating electric current from which was obtained the half-wave, rectified current passing through the filament. It should be pointed out, however, that the wave form of the modulated D.C. current produced by the detector might be a somewhat distorted sign wave due to uneven rates of heating and cooling of the light filament.

A convenient method for controlling both the spectral range and the magnitude of intensity fluctuation of radiation emitted by a light filament is to heat it with a combination of alternating and direct current. The spectral range of emitted radiation will be determined by the total magnitude of current flowing through the filament, while the magnitude of the intensity fluctuation will be determined by the proportion of the alternating current used to the total amount of current passing through the filament. The frequency of light intensity fluctuation is dependent only on the nature of the alternating current and is not affected by changes in magnitude of the direct current. In preferred embodiments of the apparatus described hereinafter, the two light sources have filaments which are heated by a combination of alternating and direct current, since such an arrangement permits maximum flexibility in using the instrument for analysis of a variety of substances over wide ranges of concentrations. However, it is to be understood that various circuits can be employed to give the desired effects.

Figure 4:
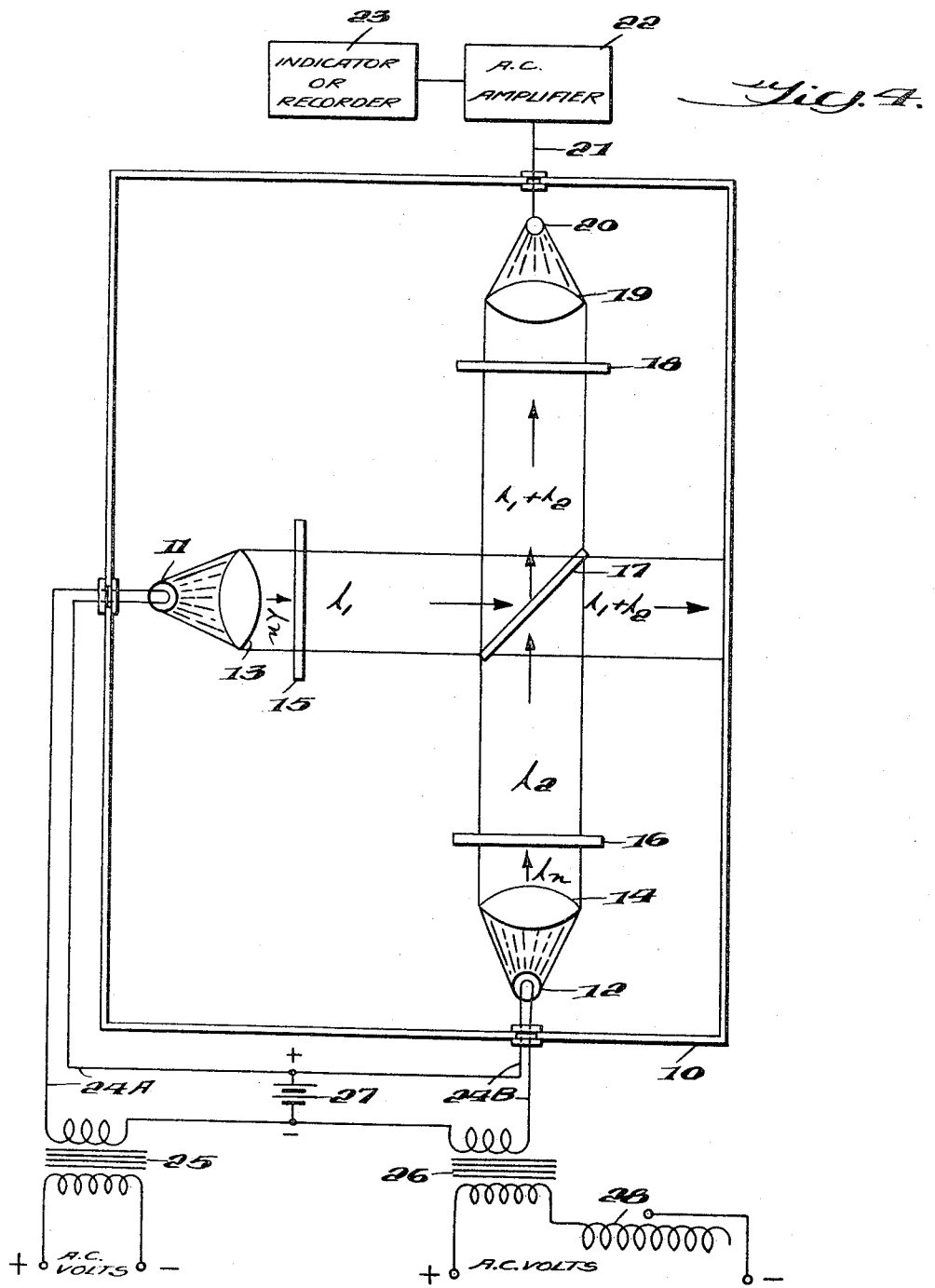
FIGURE 4 illustrates diagrammatically one of the simpler embodiments of the present invention.

Referring to FIGURE 4, the optical system of this embodiment of the analytical apparatus is enclosed in housing 10 that keeps out dust, and the like, as well as unwanted stray radiation from outside sources. The interior walls of housing 10 are coated with a black coating which absorbs any scattered radiation within the apparatus that does not follow the desired optical path and might otherwise interfere with proper operation of the apparatus.

The optical system within housing 10 includes two light sources 11 and 12 positioned 90° from one another, collimating lenses 13 and 14, narrow-band light filters 15 and 16, half-silvered mirror 17, which functions as a beam splitter, sample 18 that is being analyzed, condensing lens 19 which focuses radiation onto detector 20 which is capable of converting radiant energy into an electrical signal. The electrical signal produced by detector 20 is transmitted by means of conduit 21 through housing 10 into amplifier 22 which sends the amplified signal to the indicator or recorder 23. The amplifier 22 and indicator or recorder 23 can be conveniently located at a distance from the optical system enclosed in the housing.

Electrical current is supplied to light sources 11 and 12 through leads 24A and 24B, respectively, from the electrical system located outside of housing 10 and which can be situated a considerable distance from the optical system. The electrical system comprises stepdown transformers 25 and 26, the primary coils of which are connected to a common source of alternating current. The secondary coils of the two stepdown transformers 25 and 26 are connected in phase and in series with each other and with the two light sources 11 and 12. Battery 27, which is, preferably, of a voltage higher than the output voltage of either of the transformers 25 and 26, is connected in the electrical system so as to provide two parallel D.C. circuits, one of which includes light source 11 and the secondary coil of transformer 25, while the other D.C. circuit includes light source 12 and the secondary coil of transformer 26. The primary coil of transformer 26 is connected in series with variable inductor 28 which can be used to adjust the output of transformer 26, thus, change the relative intensity of the radiation from the two light sources 11 and 12.

This electrical supply system provides a combination of alternating and direct current which flows through the light sources 11 and 12 to cause the radiation from them to fluctuate in intensity as has been previously described. Because of battery 27, the flow of alternating current through the light sources 11 and 12 is partially restricted (essentially partially half-wave rectified) and the maximum surges of alternating current through each of the two light sources 11 and 12 occur at a frequency the same as that of the alternating current, but are 180° out of phase. In other words, the rectifying action of battery 27 causes successive half-cycles of alternating current to surge alternatively through each of the two light sources 11 and 12. As a result of the alternating surges of current through the light sources 11 and 12, the radiation emitted will fluctuate in intensity at a frequency equal to that of the alternating current, however, the radiation from the two light sources 11 and 12 will be fluctuating 180° out of phase.

Light source 11 emits a spectrum of radiation of various wave lengths ($\lambda n$) which pass through collimating lens 13 that causes a parallel beam to pass through filter 15 which is transparent only to radiation of a narrow band of radiation $\lambda_1$ that is preferentially absorbable by a constituent of the sample 18 being analyzed. The beam of collimated radiation $\lambda_1$, which will be referred to as the analytical beam, passes from filter 15 and strikes the half-silvered mirror 17 that is positioned at an angle of 45° to the path of the reference beam. Approximately one-half of the reference beam $\lambda_1$ passes through the half-silvered mirror 17 while the other portion is reflected at an angle of 90° from its original path.

In a similar manner, radiation from light source 12, which has a spectral range of wave lengths ($\lambda n$) somewhat similar to that of the radiation from light source 11, is collimated by lens 14 and travels as a parallel beam toward filter 16, which is transparent only to a narrow band $\lambda_2$ of wave lengths not appreciably absorbable by sample 18. This collimated beam of radiation $\lambda_2$, which will be referred to as the reference beam, strikes half-silvered mirror 17 and approximately one-half of the beam $\lambda_2$ is reflected at an angle of 90° from its original path while the other portion of the beam $\lambda_2$ passes through the half-silvered mirror 17.

From the half-silvered mirror 17, there emerge two beams of radiation which are traveling from the mirror 17 at right angles from each other. Each of the two beams is composed of bands of radiation $\lambda_1$ and $\lambda_2$ from light sources 11 and 12, respectively. The beam of combined radiation containing radiation $\lambda_1$ which passed through mirror 17 is allowed to strike the instrument housing 10 where it is completely absorbed by the dark coating. The other beam of combined radiation passes through sample 18 which absorbs a portion of the analytical beam component $\lambda_1$, in an amount depending upon the concentration of absorbing constituent present in the sample 18. After passing through the sample 18, the combined beam passes through condensing lens 19 which focuses the radiation upon detector 20, which converts the radiation received into an electrical signal.

The radiation striking detector 20 is composed of bands $\lambda_1$ and $\lambda_2$ which are fluctuating 180° out of phase with one another at the same frequency as the frequency of the alternating current passing through the primary coils of stepdown transformers 25 and 26. Hence, the electrical signal generated by the detector will be fluctuating at the same frequency as the alternating current passing through the primary coils of transformers 25 and 26. The amplitude of the fluctuating electrical signal produced by detector 20 will be determined by the magnitude of the difference in intensity of radiation of the analytical band $\lambda_1$, and the reference band $\lambda_2$. The difference in intensity of $\lambda_1$ and $\lambda_2$ striking the detector is, in turn, a function of the concentration of the constituent in the sample that absorbs light of the analytical band $\lambda_1$.

The fluctuating electrical signal from the detector 20 is transmitted through conduit 21 to the A.C. amplifier 22, which is tuned to a frequency equal to that of the alternating current passing through the primary coils of transformer 25 and 26; and magnifies the signal to a degree sufficient to operate indicator 23, which can be a recorder calibrated to directly read the concentration of the light absorbing constituent in the sample 18.

For most satisfactory operation it is desirable that the two light sources 11 and 12 be similar in radiation characteristics and be operated at approximately equal temperatures. This can be done by employing transformers 25 and 26 having equal output voltages. However, if the light sources have slightly different emission characteristics, or if the half-silvered mirror 17 does not split beams $\lambda_1$ and $\lambda_2$ evenly, the two components leaving the mirror in the direction of the sample may be equalized by varying the relative intensities of the radiation from the two sources by adjusting variable inductor 28.

It is also preferred that filter 16 be chosen to provide a reference band $\lambda_2$ having radiation close in wave lengths to those in the analytical band $\lambda_1$. When this is done, the intensities of $\lambda_1$ and $\lambda_2$ are more easily balanced and the response of the detector to the radiation from the two bands of radiation $\lambda_1$ and $\lambda_2$ is more nearly equal; hence, there will be less background noise in the signal generated by the detector, since the wave form of the signal will be least distorted.

By using lenses 13, 14 and 19 having short focal lengths and placing all of the elements of the optical system in close proximity to each other, a very compact instrument can be constructed for applications in which a bulky instrument is undesirable.

The apparatus just described and illustrated in FIGURE 4 is suitable for quantitative analysis of materials which can be either in the solid, liquid, or gaseous state. When the apparatus is used to analyze solid samples, such as film, a special container or holder is usually unnecessary; however, when a liquid or gaseous sample is to be analyzed, a suitable container having windows transparent to both $\lambda_1$ and $\lambda_2$ should be employed and preferably held in the proper position in the light beam by means of clamps or other equivalent devices known to the art.

The preferred light source is an electric light bulb having a tungsten filament, since such source can be used to provide a broad spectrum of radiation which includes the infrared, visible and part of the ultraviolet regions. It should be pointed out, however, that the exact nature of the source is not critical if it is capable of providing the desired wave lengths of radiation and can be caused to fluctuate in intensity at the desired frequency over a suitable range of intensities.

Although lenses 13, 14 and 19 are the preferred means of collimating the light beams from the two light sources, and to focus the composite beams onto the detector 20, suitable concave mirrors can be used for these purposes, if desired. Diffraction gratings or prisms can be used to replace the light filters 15 and 16, providing of course, they are properly positioned in the respective light beam so as to diffract or refract the desired radiation $\lambda_1$ and $\lambda_2$ onto beam splitting, half-silvered mirror 17 which can be made of any solid substance which is transparent to both light beams $\lambda_1$ and $\lambda_2$ and can be half-"silvered" with a very thin deposit of any relatively non-corrosive, light reflecting metal such as aluminum, gold, silver, platinum or the like.

The detector 20 can be of any suitable type, e.g., bolometer, thermocouple, photo-electric cell, photo-conductive cell, etc., which is capable of responding to radiation of the wave lengths in the anatytical and reference bands $\lambda_1$ and $\lambda_2$ at the frequency at which their intensities fluctuate.

The particular electrical supply system shown in FIGURE 4 for supplying the current to the light sources is the preferred circuit for causing the radiation emitted by the sources to fluctuate in intensity out of phase; however, it should be clearly understood that the invention is not limited to this particular circuit. One of the circuits illustrated in FIGURES 5, 6, 7 and 8 can be used advantageously in certain instances.

It is preferred that the alternating current supplied to transformers 25 and 26 be 115-volt 60-cycle current which is so readily available and low in cost. A 60-cycle A.C. amplifier is also preferred, since relatively simple amplifiers tuned to this frequency are commercially available at low cost, yet are quite satisfactory for use in the apparatus of this invention. (Known absorption spectral apparatus which employ complicated, specially designed amplifiers are not only initially expensive, but are also difficult to maintain, since repair parts are not widely available.) Although 60-cycle is the preferred frequency for both the alternating circuit supply and for the amplifier, it should be clearly understood that other frequencies can be used satisfactorily, but only at a sacrifice of some convenience and expense. Also, it is preferred that the frequency of the alternating current supply and the frequency of operation of the amplifier be equal; however, this is not a necessary requirement, since in certain instances the amplifier can be tuned to a frequency which is a multiple of the frequency of the alternating current supply. For example, if the particular circuit illustrated in FIGURE 7 is used with 60-cycle current, the two light sources will fluctuate in intensity out of phase at 120 cycles per second, hence a 120-cycle amplifier can be used.

The apparatus illustrated in FIGURE 9 is a particularly preferred embodiment of this invention which has been found to be quite accurate and reliable and well adapted for such special purposes as continuously scanning and measuring the moisture content across the width of a moving web of cellulosic film. Most of the components of this apparatus as well as the principle of operation are essentially the same as those already described; therefore, only the difference between this apparatus and that illustrated in FIGURE 4 will be discussed.

The housing 10 of the apparatus illustrated in FIGURE 9 is composed of two parts A and B which can be fastened securely along the plane of the sample 18, if desired, or can be separated sufficiently to allow a sample of materials, such as films, of greater width than instrument housing 10 to be inserted into the light path and to be analyzed. Mirrors 29, 30 and 31 provide a deviated path for one of the beams containing $\lambda_1$ and $\lambda_2$ from beam-splitting, half-silvered mirror 17 such that the composite beam passes twice through the sample 18, then is reflected by mirror 31 to condensing lens 19 which focuses the composite beam upon lead sulfide detector 32. The other composite beam from half-silvered mirror 17 is condensed by lens 33 and focused onto a second lead sulfide detector 34.

The two lead sulfide detectors 32 and 34, which are preferably a matched pair having very similar operating characteristics are connected in series with a source of D.C. voltage, the negative terminal of which is grounded. The signal generated by the two detectors 32 and 34, whose resistance vary in accordance with the intensity of radiation striking them, is transmitted to A.C. amplifier 22 which is coupled to the detector circuit through condenser 35 which is connected between detector 32 and 34. The amplified signal is then transmitted to Servo-motor 36 which drives autotransformer 37 to either increase or decrease its output, depending upon whether the intensity of $\lambda_1$ or $\lambda_2$ passing through sample 17 is greatest. The autotransformer 37, is connected to the primary coil of transformer 38 while the secondary coil of transformer 38 is connected in series with transformer 26. Hence, the setting of autotransformer 37 will determine the amount of alternating current-passing through transformer 26 and, consequently, the relative intensities of radiation from the two light sources 11 and 12.

The Servo-motor 36 and autotransformer 37 are connected in a manner such that a signal from the detector will cause the autotransformer 37 to change its setting so as to restrict the flow of current from the output of transformer 26 to light source 12 which provides reference beam $\lambda_2$ which, in turn, decreases the intensity of that light source and decreases the magnitude of the signal, thus automatically achieving a null balance. Since the position of the movable contact of autotransformer 37 at null balance is determined by the concentration of the constituent in sample 18 which absorbs radiation from the analytical band $\lambda_1$ the autotransformer 37 is provided with a calibrated scale from which the concentration of light absorbing constituent can be read directly.

The use of the two detectors 32 and 34 connected in series and both of the composite beams in the manner just described provides for very stable operation, since temperature variations within the instrument, fluctuations in the voltage of the current being supplied to the light sources, and differences in the emission characteristics of the two light sources 11 and 12 are compensated for to a great degree.

When it is desired to use the instrument illustrated in FIGURE 9 to continuously scan and measure the concentration of a constituent in a web of film, the portion of the apparatus contained in housing section 10A is mounted on a traversing mechanism, while the portion of the apparatus contained in housing section 10B is mounted on the opposite side of the film on a similar traversing mechanism. The two traversing mechanisms are equipped with driving means which cause the two portions of the apparatus to move simultaneously across the width of the film being scanned while in alignment. If mirrors 29 and 30 are somewhat larger in dimensions than the dimensions of the composite light beam, exact alignment between the two portions of the apparatus is not necessary for satisfactory operation, hence elaborate carefully milled traversing mechanisms are unnecessary.

An illustrative example constructed in accordance with this invention was an apparatus quite similar in design as that illustrated in FIGURE 9. As light sources 11 and 12, two type G.E. No. 1209 electric light bulbs were employed. The electrical supply system consisted of a battery 27 supplying 3 volts, at the filament, two step-down transformers 25 and 26 to convert the 115-volt, 60-cycle current which was used to 2.5 volts A.C. at the filament. The magnitude of the current through the primary coil of transformer 26 was controlled by connecting it in series with the secondary coil of transformer 38 which has a turn ratio of 20 between the primary and secondary coils. The primary coil of transformer 38 was connected to the output of autotransformer 37 which was capable of varying the 115-volt A.C. current supplied to it to A.C.

current of 0 to 115 volts in response to movement of Servo-motor 36 and, consequently, control the current through transformer 26 and light source 12.

In the optical system, lenses 13, 14, 19 and 33 were lenses having focal lengths of 32, 32, 25 and 25 mm., respectively. Light filter 15 provided an analytical $\lambda_1$ of 1.925 microns while filter 16 provided a reference band $\lambda_2$ of 1.790 microns. The beam splitting, half-"silvered" mirror was a glass plate 2 inches by 2 inches by 1/16 inch in size on which was deposited a semi-transparent layer of aluminum. Mirrors 29, 30 and 31 were front surface mirrors of 3 inches by 3 inches in dimension.

The two detectors 32 and 34 were type N lead sulfide cells, 4 mm. x 4 mm., and biased as recommended by the manufacturer. The signal from the detector circuit was coupled through condenser 35 of .03 μf. capacitance to a Series "D," 60 cycles, A.C. amplifier with high impedence input transformer. The output signal from the amplifier 22 was used to operate Servo-motor 36.

This particular apparatus proved to be quite useful for measuring the moisture content in cellophane with an accuracy of ±0.1% water in the range of moisture content of 0 to 15%. The instrument showed little tendency to drift or to get out of adjustment, even when subjected to abnormal atmospheric conditions and considerable mechanical vibrations in plant use.

The apparatus of this invention offers the advantages of: (1) being rather simple in design and can be constructed at a reasonable cost by mechanics and electricians having only ordinary technical skills, (2) having an optical system containing no moving parts or other delicate components that require very critical alignment and are likely to get out of alignment when subjected to abnormal environment or vibration, (3) being constructed in a very compact form, if desired, (4) the apparatus shown in FIGURE 9 which is well suited for mounting to traverse and analyze film since alignment between sections A and B is not very critical, and (5) having a rather simple, inexpensive, commercially available A.C. amplifier employed, while most of the known apparatus must use complicated D.C. amplifiers especially designed for the purpose.

What is claimed is:

1. Apparatus for absorption spectral analysis comprising
   (a) a housing,
   (b) two radiation sources secured to said housing adapted to radiate continuously over a selected spectral range,
   (c) electrical circuitry means operatively connected to said radiation sources adapted to continuously fluctuate the radiation intensity of each of said radiation sources,
   (d) including electrical means operatively associated with said electrical circuitry means adapted to regulate the frequency phase relationship between said two radiation sources whereby said two radiation sources radiate 180° out of phase with one another,
   (e) means within said housing positioned in optical alignment with each of said radiation sources adapted to collimate the radiation emitted therefrom,
   (f) first radiation selecting means secured in said housing in optical alignment with one of said radiation sources adapted to optically filter the radiation emanating therefrom whereby a selected band of radiation which is a reference beam passes through said first radiation selecting means,
   (g) second radiation selecting means secured in said housing in optical alignment with the other of said radiation sources adapted to optically filter the radiation emanating therefrom whereby a selected band of radiation which is an analytical beam passes through said second radiation selecting means,
   (h) and stationary beam-splitting means supported in said housing and positioned in optical alignment with and in angular relation to both said first and said second radiation selecting means adapted to split the radiation incident thereupon from each of said first and said second radiation selecting means into two optical paths spaced 90° apart with respect to each other and each constituted of said reference beam and said analytical beam,
   (i) a sample support means in said housing adapted to support a specimen material in optical alignment with and transversely of one of said two optical paths whereby one of said two optical paths passes through said specimen,
   (j) and detector means supported in said housing adjacent said sample support means and adapted to generate an output electrical signal responsive to the radiation impinging thereupon from said specimen material in said sample support means whereby said signal is of a frequency corresponding to the frequency of radiation of said two radiation sources,
   (k) means to compare the amplitudes of said fluctuating output electrical signal.

2. The apparatus of claim 1 wherein the two radiation sources comprise electric light bulbs and circuitry means for supplying said bulbs with 60-cycle, modulated direct current 180° out of phase.

3. An apparatus for absorption spectral analysis comprising, in combination, a housing, two light sources secured to said housing, circuitry means for supplying said light sources with a direct electrical current which has a 60-cycle alternating electrical current superimposed thereon; circuitry means for passing this current through said two light sources 180° out of phase with one another; means positioned in optical alignment with each of said two light sources for collimating radiation emitted from each of said two light sources into two distinct paths intercepting at an angle of about 90° with respect to each other; a radiation filter in optical alignment with one of said collimating means for selecting from the collimated radiation from one of said light sources a band of radiation which is the reference beam; a radiation filter in optical alignment with a second one of said collimating means for selecting from the collimated radiation from the other light source a band of radiation which is the analytical beam, both of said filters positioned such that the reference beam and analytical beam intersect; stationary beam-splitting means disposed at the intersection of said reference beam and said analytical beam for continuously splitting each of said bands of collimated radiation and combining a portion of each of said bands into at least one optical beam constituted of collimated radiation from each of said light sources adapted to be directed through the material being analyzed; detector means positioned to receive the reference beam and analytical beam passing through the material being analyzed; means responsive to the fluctuating signal generated by the detector means to adjust the intensity of the radiation from one of said light sources to equalize the amount of radiation received from both light sources by the detector, wherein the magnitude of said adjustment is a measure of the concentration of the radiation absorbing constituent of the material being analyzed.

4. An apparatus for absorption spectral analysis comprising, in combination, a housing, two light sources secured to said housing, circuitry means for supplying said light sources with a direct electrical current which has an alternating electrical current superimposed thereon; circuitry means for passing this current through said two light sources 180° out of phase with one another; means positioned in optical alignment with each of said two light sources for collimating radiation emitted from each of said two light sources, a radiation filter in optical alignment with one of said collimating means for selecting from the collimated radiation from one of said light sources a band of radiation which is the reference beam; a radiation filter in optical alignment with a second collimating means for selecting from the collimated radiation from the other light source a band of radiation which is the analytical beam, both of said filters positioned such that the reference beam and analytical beam intersect; stationary beam-splitting means supported in said housing and positioned in optical alignment with and in angular relation to both said reference beam and said analytical beam adapted to split each of said analytical beam and reference beam into two optical paths spaced 90° apart with respect to each other and each constituted of said analytical beam and said reference beam; optical means cooperatively disposed within said housing in optical alignment with one of said optical paths adapted to cause said beam to pass twice through the material being analyzed; two matched detectors connected in series with a D.C. electrical source, one detector positioned to directly receive the beam of directed radiation and the other detector positioned to receive the beam of directed radiation passing twice through the material being analyzed, said detectors adapted to generate a modulated D.C. electrical signal responsive to any unbalance in the amount of radiation impinging upon said respective detectors; means responsive to the modulated D.C. signal adapted to be generated by said detectors for adjusting the intensity of the radiation from one of said light sources to equalize the amount of radiation received from both light sources by said detectors, wherein the magnitude of said adjustment is a measure of the concentration of the radiation absorbing constituent of the material being analyzed.

References Cited

UNITED STATES PATENTS

| | | | |
|---|---|---|---|
| 2,547,212 | 4/1951 | Jamison et al. | 88—14 |
| 2,561,243 | 7/1951 | Sweet | 88—14 |
| 2,562,181 | 7/1951 | Frommer | 88—14 |
| 2,764,692 | 9/1956 | Miller | 88—14 |
| 2,783,676 | 3/1957 | Lanneau et al. | 250—220 |
| 2,984,149 | 5/1961 | Herscher et al. | 88—14 |
| 3,004,664 | 10/1961 | Dreyfus | 88—14 |

JEWELL H. PEDERSEN, *Primary Examiner.*

T. L. HUDSON, W. A. SKLAR, *Assistant Examiners.*